No. 687,642. Patented Nov. 26, 1901.
G. E. MEDLEY.
FISHING REEL.
(Application filed Jan. 15, 1901.)
(No Model.) 3 Sheets—Sheet 1.
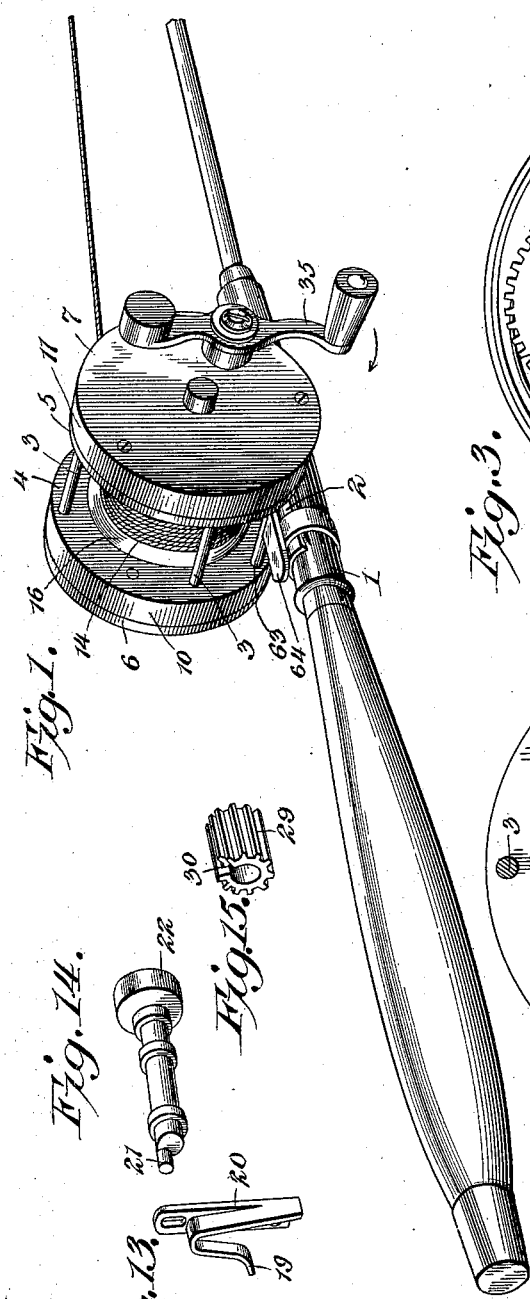
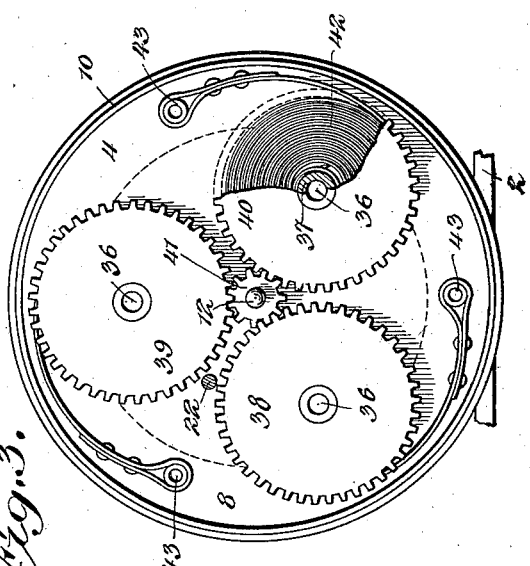
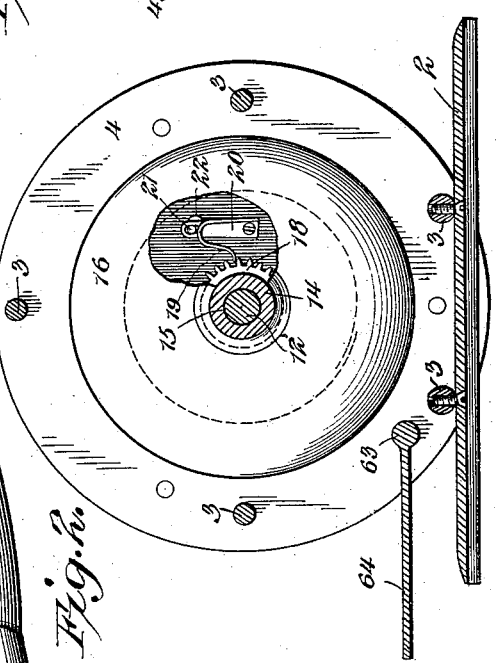
Granville E. Medley, Inventor.
Witnesses
Howard D. Orr.
Louis L. Julihn
By
E. G. Siggers,
Attorney No. 687,642.  
G. E. MEDLEY.  
FISHING REEL.  
(Application filed Jan. 15, 1901.)  
Patented Nov. 26, 1901.
(No Model.)  
3 Sheets—Sheet 2.
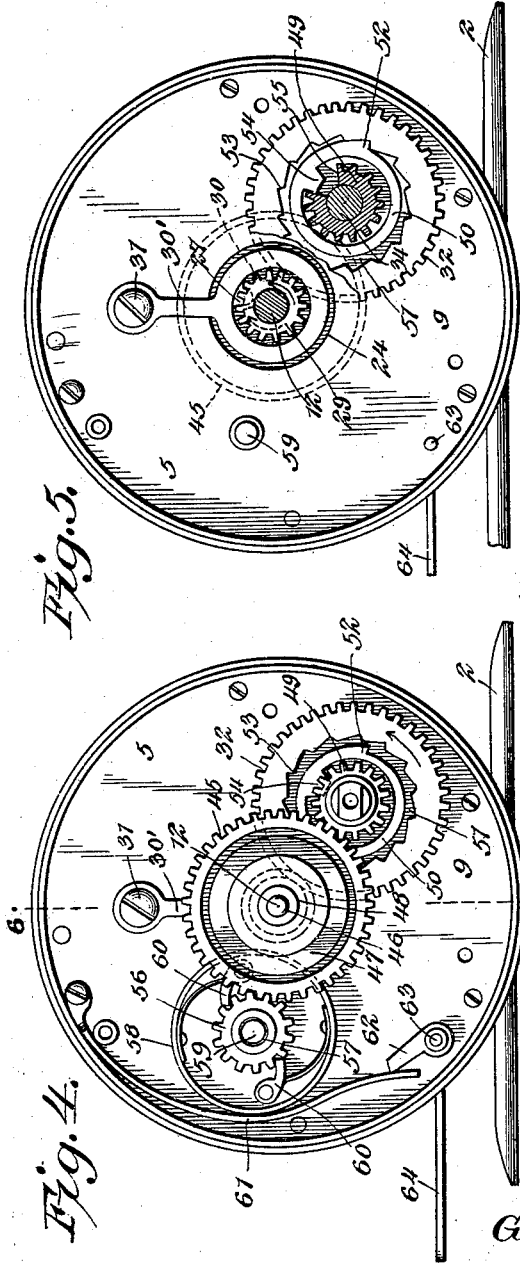
Granville E. Medley, Inventor.
Witnesses  
By  
Attorney No. 687,642. Patented Nov. 26, 1901.
G. E. MEDLEY.
FISHING REEL.
(Application filed Jan. 15, 1901.)
(No Model.) 3 Sheets—Sheet 3.
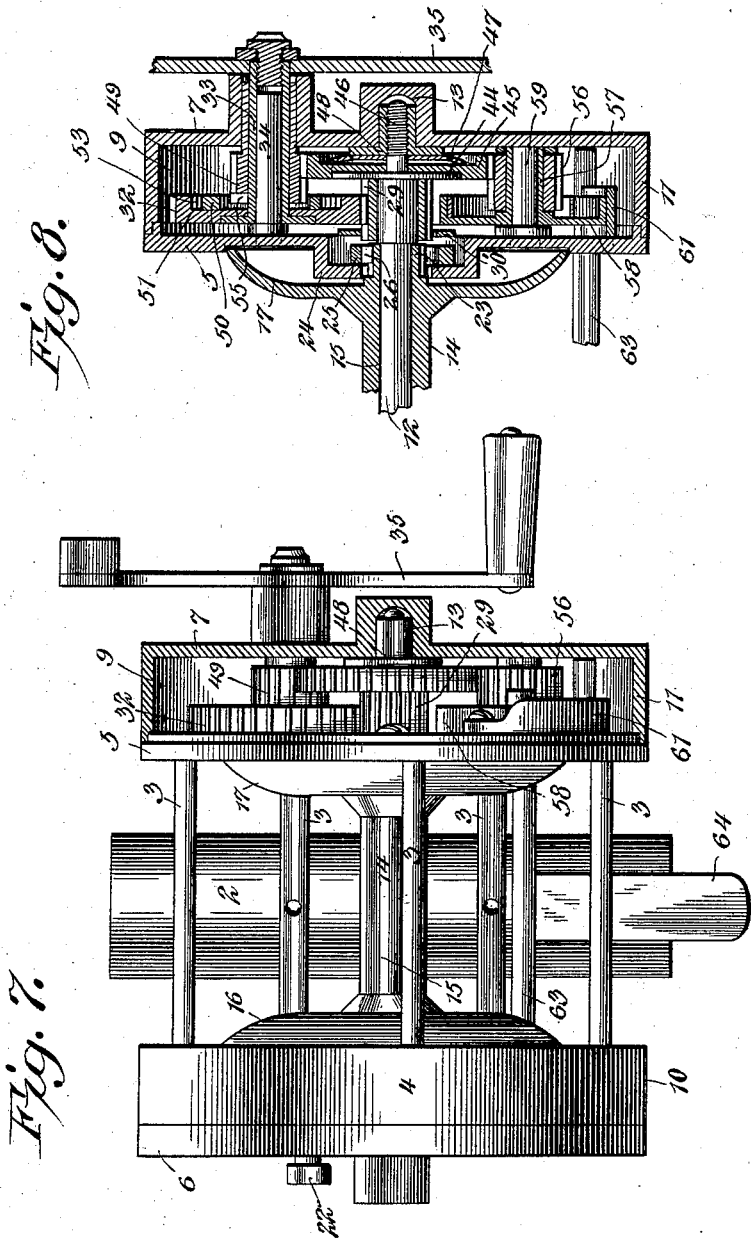
Granville E. Medley, Inventor.
Witnesses

UNITED STATES PATENT OFFICE.

GRANVILLE E. MEDLEY, OF JULIAN, KENTUCKY, ASSIGNOR OF ONE-HALF TO GIPP WATKINS, OF GRACEY, KENTUCKY.

FISHING-REEL.

SPECIFICATION forming part of Letters Patent No. 687,642, dated November 26, 1901.

Application filed January 15, 1901. Serial No. 43,397. (No model.)

*To all whom it may concern:*

Be it known that I, GRANVILLE E. MEDLEY, a citizen of the United States, residing at Julian, in the county of Christian and State of Kentucky, have invented a new and useful Fishing-Reel, of which the following is a specification.

My present invention relates to improvements in fishing-reels of that class wherein the line-spool is employed in connection with a winding-spring and a crank operatively related to the spool in a manner to permit the actuation of the spool either manually or under the impulse of the spring.

The primary object of the invention is to provide a simple, strong, and efficient reel of the class specified which shall have the general form and appearance of reels of ordinary character — that is to say, which embody merely a rod-plate, a series of transverse posts, and a pair of heads of practically the same dimensions, these several parts being aggrouped to constitute a support and a housing for the line-reel mounted upon a suitable arbor piercing the heads axially.

A further object of the invention is to effect such relation of the line-spool with respect to the mainspring and operating-crank that said spool may be rotated independently of both of these operating devices to facilitate casting or may be connected to either of them, as desired by the operator, for the purpose of winding the spool or of imposing a drag upon the line under the impulse of the spring or for the purpose of winding the spool manually by the operation of the crank, as may be most effective in hooking, playing, breaking down, and drawing in the fish.

A further object of the invention is to enable the spring to be rewound for the storage of power without necessity for the use of keys or other special winding mechanisms ordinarily employed, the desired end being accomplished in the preferred form of my invention by effecting an operative connection between the crank and arbor to effect the rewinding of the spring by the rotation of the crank in the reverse direction from that which serves to effect the manual actuation of the line-spool.

A still further object of the invention is to group the line-spool, the driving-spring, and the crank in operative relation by means of a novel form of clutch mechanism, which is completely automatic in its operation and which without attention connects the spool with either of the spool-operating devices as it is rendered active or automatically disconnects the spool from both of said spool-operating devices whenever the spool itself is made the active member — as, for instance, when the line is being cast — that is to say, the clutch mechanism is normally negative and permits the spool to rotate freely in either direction without hindrance from either the crank or the spring; but the instant the spring is tripped or released or the instant the crank is rotated in the forward direction the clutch will automatically connect either of these devices, as the case may be, with the spool to permit the line to be wound or a drag to be imposed thereon, as desired.

A still further object of the invention is to accommodate the reel to very long lines and to secure a high speed without a corresponding loss of effective energy, this end being effected by the employment of a plurality of springs geared to the arbor of the reel by multiplying-gearing.

Further and subordinate objects of the invention will hereinafter more fully appear as the necessity for their accomplishment is developed in the succeeding description of the preferred embodiment of my invention illustrated in the accompanying drawings and defined in the appended claims.

In said drawings, Figure 1 is a perspective view of my reel attached to a rod in the usual manner. Fig. 2 is a sectional view showing one of the reel-heads in elevation and showing a part of the line-spool broken away to disclose the click device. Fig. 3 is an end elevation of the reel with one of the cap-plates removed to show the arrangement of the spring-motor. Fig. 4 is a similar view of the opposite end of the reel, showing the gearing associated in a manner to permit the manual winding of the reel. Fig. 5 is a view similar to Fig. 4 with certain of the parts removed to show the clutch-ring 50 disposed in position to clutch the pinions 32 and 49. Fig. 6 is a central longitudinal section through the reel complete on the line 6 6 of Fig. 4. Fig. 7 is a plan view thereof, showing one of the heads in section to expose the gearing. Fig. 8 is a sectional view through one end of the reel, showing the relation of the various elements of the gearing. Fig. 9 is a detail view illustrating the construction and arrangement of one of the clutch-rings, the latter being shown in its engaged position. Fig. 10 is a similar view showing the clutch-ring disengaged. Figs. 11 and 12 are detail perspective views of the two clutch-rings. Fig. 13 is a perspective view of the click-spring. Fig. 14 is a similar view of the operating device. Fig. 15 is a perspective view of one of the pinions, and Fig. 16 is a similar view of the sleeve and pinion mounted upon the crank-shaft.

Referring to the numerals employed to designate corresponding parts throughout the views, 1 indicates a rod, illustrated merely for the purpose of showing the application of my invention.

2 is the usual rod-plate or saddle, and 3 the usual transverse posts extending between the head-plates 4 and 5. The rod-plate or saddle 2 is rigidly connected to a pair of the posts 3 for the purpose of rigidly sustaining the reel upon the rod in the usual manner. In spaced relation to the head-plates 4 and 5, which are of circular form, are a pair of correspondingly-shaped cap-plates 6 and 7, defining the outer walls of a pair of hollow heads 8 and 9, defined between the head and cap plates and inclosed by annular flanges or outer walls 10 and 11, the former being integral with the head-plate 4 and the latter with the cap-plate 7. The cap-plates 6 and 7 constitute supports for the axially-disposed arbor 12, having its ends journaled in suitable recesses 13 in the inner faces of the cap-plates, which are provided with axial bosses, as shown, to accommodate the arbor.

The line-spool 14 is substantially of ordinary form and is loosely mounted upon the arbor 12 between the head-plates. The spool consists of a hollow hub 15 and the convex end disks 16 and 17. Within the concavity of the disk 16 and between it and the adjacent head-plate is formed integral with the spool a toothed click-wheel 18, designed to be engaged by a click or alarm spring 19, carried by a pivoted plate 20, having its free end slotted for the reception of the eccentric stud 21, formed upon the stem of a button 22. The button is disposed beyond one end of the reel and is designed to be rotated to shift the plate 20 for the purpose of presenting the click-spring into or out of engagement with the wheel 18.

Within the concavity of the disk 17 and disposed in a position corresponding to the wheel 18 is formed a small ratchet-wheel 23, encircled adjacent to the disk 17 by a central circular depression 24, formed at the center of the head-plate 5 and having an axial opening, which, as shown in the drawings, is of sufficient size to permit the free rotation of the ratchet-wheel 23. Likewise located within the depression 24 and disposed to encircle a portion of the ratchet-wheel 23 is what may be termed a "clutch-ring" 25. This ring is not, however, of truly-circular form, but is of slightly-irregular shape and is provided with an internal pawl-tooth 26, an internal gear-tooth 27, and with a bearing-lug 28, the latter being disposed at a point nearly diametrically opposite to the gear-tooth 27 and extended from one side face of the clutch-ring, as best seen in Fig. 11 of the drawings. The internal dimensions of the ring 25 are such as to permit it to have sufficient movement to present the pawl-tooth 26 into and out of engagement with the teeth of the ratchet-wheel 23, notwithstanding the fact that this ring also encircles one end of a spur-pinion 29, mounted loosely upon the arbor within the head 9 and having a recess 30 at one end for engagement with the gear-tooth 27 of the ring.

By reference to Fig. 9 it will be noted that if the pinion 29 is rotated to carry the clutch-ring 25 in the direction of the arrow the pawl-tooth will engage a tooth of the ratchet-wheel 23, and an operative connection will thus be established between the pinion 29 and the line-spool. If, however, the pinion is operated to move the ring in a reverse direction, the tooth 26 will move along the inclined face of the adjacent tooth of the ratchet-wheel, and the clutch-ring will thus be shifted out of engagement with the ratchet to permit the rotation of the pinion in the direction of the dotted arrows in Figs. 9 and 10 independently of the line-spool. It follows that as the pinion 29 is rotated in one direction or the other it will be automatically clutched to the line-spool or released therefrom. It is also necessary, as heretofore stated, to permit the free rotation of the spool without possibility of its becoming connected to the gear wheel or pinion 29, as it is this freedom of movement which enables the reel to be used for line-casting. Therefore in order to retain the clutch-ring 25 yieldingly in its disengaged position I provide a clutch-ring-retaining spring 30' of circular form surrounding one end of the pinion 29 and bearing against the seat 28 of the clutch-ring 25. The stem of the spring 30' extends radially therefrom and is secured at its outer end, as by a screw 31, as best seen in Figs. 4, 5, and 6. The pressure exerted by this spring upon the seat 28 will not oppose any material resistance to the movement of the ring into or out of its clutched position, but will be sufficient to retain the ring in a disengaged position to permit the free and independent rotation of the line-spool without danger of the ring being accidentally thrown to its clutched position. The pinion 29 is driven by a somewhat larger gear-wheel 32, mounted upon the inner end of a hollow crank-shaft 33, journaled upon a stud-shaft 34 and provided upon its outer extremity beyond the cap-plate 7 with the usual operating handle or crank 35.

The group of mechanism thus far described comprises a crank-shaft provided with a crank exposed exterior to one of the heads and multiplying-gearing interposed between the crank-shaft and the line-spool, and it further comprehends an automatic clutch disposed to effect the engagement or disengagement of the spool to or from the crank-shaft, according to the direction of rotation of the latter and without necessitating the reorganization of any part of the train of multiplying-gearing. This brings us to a consideration of the means whereby the spool may be operated or opposed by a drag under the impulse of a spring-motor controlled by a suitable trip device and designed to be rewound, as already premised, by a reverse rotation of the crank. Within the head 8 at the end opposite the gearing I mount a series of, say, three stud-shafts 36 for the reception of the hollow hubs 37 of the gear-wheels 38, 39, and 40 of comparatively large size and meshing with a pinion 41 upon the arbor 12. Around each of the hubs 37 is wound a comparatively powerful motor-spring 42, the inner ends of which springs are secured to the hubs and have their outer ends looped for attachment to the retaining-posts 43, extending from the head-plate 4. This arrangement of a series of motor-springs geared to the arbor by interposed speed-gearing is considered an important feature of the present invention, because under ordinary circumstances the single spring usually employed in this class of devices is ineffective, as it is only possible to wind the line automatically for a short portion of its length. It is practically impossible to employ high-speed gearing between a single motor-spring and an arbor, for the reason that as soon as the initial force of the spring has been expended it lacks the power to continue the rotation of the spool at the required high rate of speed. I have found, however, that this speed-gearing may be employed effectively by utilizing a series of motor-springs which supply sufficient power to make possible the employment of the speed-gearing, and consequently effect the automatic winding of an exceedingly long length of line. In other words, this duplication of the springs enables me to increase the speed without decreasing the effective power applied in winding the line or for exerting a drag upon the line when the fish is being played.

It now remains to be seen in what manner the spring propelling mechanism or motor is controlled and how the crank-shaft is geared to the arbor in a manner to effect the rewinding of the springs by the reverse rotation of the crank. Upon the arbor 12, adjacent to the outer end of the pinion 29, is formed a rigid disk 44, against which abuts the side face of a comparatively large gear-wheel 45, surrounding a threaded reduced portion 46 of the arbor and pressed with more or less force against the flange or disk 44 by a concavo-convex friction-disk or resistance device 47, which is in turn pressed to its proper position by a compression-nut 48, screwed upon the reduced portion 46 of the arbor. It is through the medium of the wheel 45 that power is applied by the springs to drive the spool, and said wheel is likewise the medium through which the power exerted by the reverse rotation of the crank is communicated to the arbor for the rewinding of the springs. It will therefore appear that if the resistance device, which constitutes the sole connection between the wheel and the arbor, is adjusted or set to yield under the exertion of a pressure dangerous to the life of the springs the breaking or derangement of the springs or other parts of the reel is absolutely prevented, as the wheel 45 will slip idly upon the arbor whenever a predetermined maximum resistance is encountered.

For the purpose of rotating the arbor to wind the springs the power-shaft 33 is provided with a loosely-mounted pinion 49, meshing with the wheel 45 and designed to have its connection with the crank-shaft controlled by a clutch-ring 50, similar to the ring 25. The difference between these clutch devices is that they are oppositely active, the ring 25 moving to its clutching position when the crank-shaft is rotated in one direction and the clutch-ring 50 moving to its clutched position when the crank-shaft is reversed. In order to attain this end, the clutch-ring 50 is disposed within a recess 51, formed in the face of the wheel 32, and is provided with an external pawl-tooth 52, disposed for engagement with internal ratchet-teeth 53, formed in the peripheral wall of the recess.

The connection between the clutch-ring 50 and the pinion 49 is effected by means of the internal gear-tooth 54, extending from the ring for engagement with a recess 55 in the pinion. The clutch-ring 50, like the ring 25, is of slightly irregular or eccentric form, and its operation is substantially identical with the operation of the ring 25, which has heretofore been described in detail.

At the side of the gear-wheel 45 opposite its connection with the pinion 49 is disposed a toothed wheel 56, loosely revoluble upon the hollow shaft 57 of a brake-drum 58, likewise loosely mounted upon a stud-shaft 59, projecting from the head-plate 5. The wheel 56 is connected with the drum for synchronous rotation in one direction by means of a pair of spring-pressed pawls 60, mounted upon the face of the drum, and the movement of the latter is controlled by a stout detent-spring 61, secured at one end to the plate 5 and bearing at a point intermediate of its ends against the periphery of the drum. The swinging of the spring 61 out of contact with the drum 58 is effected by means of the finger 62, projecting from the rock-shaft 63, journaled at its opposite ends in the head-plates 4 and 5 and provided immediately over the rod with a thumb-piece or trip 64, by means of which the release of the drum may be effected whenever it may be desirable for the purpose of automatically operating the drum or of imposing a drag upon the line.

The operation of the reel is as follows: Under ordinary conditions the line-spool is capable of free and independent rotation in either direction, for the reason that normally the clutch-ring 25 is out of engagement with the ratchet-wheel 23 and is retained in such position by the compression-spring 30. If now it is desired to wind up the line with the manual winding mechanism, the crank 35 is rotated in the direction of the arrow in Fig. 1, which will cause the gear-wheel 32 to rotate in the proper direction to drive the pinion 29 in the direction of the full-line arrow in Fig. 5. As we have already seen, the clutch-ring 25 will in this event automatically clutch the pinion to the line-spool, and the latter will be operated by the crank. During this operation, however, the clutch-ring 50 will remain in its unclutched position, and the pinion 49 will therefore remain inactive, and motion will not be imparted to the arbor or to the gearing connected therewith. Supposing, however, that it is desired to rewind the springs preparatory to imposing a drag upon the line or to operating the reel automatically. In this event the crank is rotated in the reverse direction, the result of which is to rotate the pinion 29 in the direction of the dotted arrow in Fig. 5 for automatically unclutching the clutch-ring 25 from the line-spool. At the same time the gear-wheel 32 will be rotated in the direction of the arrow in Fig. 4, which will cause it to become clutched to the pinion 49 through the interposed clutch-ring 50, and as the pinion will now rotate with the crank-shaft the motion of the latter will be imparted to the gear-wheel 45, and through it to the arbor 12, to rewind the springs, the toothed wheel 56 being rotated idly during the rewinding operation. As the springs are wound, they are retained against unwinding by reason of the dogging of the toothed wheel 56 by the pawls 60, which, as we have seen, are carried by the drum 58, held immovable by the detent-spring 61. If, however, during the act of rewinding the operator should exert such force as would endanger the integrity of the springs or other portion of the mechanism, it will have absolutely no effect, for the reason that, as we have seen, the wheel 45 will yield under the exertion of a predetermined pressure and will rotate upon the arbor before a force sufficient to derange the parts is communicated from the source of power. The motor-springs having been rewound in this manner the operator may exert a drag upon the line or may wind the line-spool, as the case may be, by depressing the thumb-piece 64. This will cause the finger 62 to urge the detent-spring 61 out of engagement with the drum 58, and the latter, being free to revolve, will permit the arbor to be rotated under the impulse of the motor-springs. Through the medium of the wheel 45 this motion will be communicated to the pinion 49 in a proper direction to cause said pinion to swing the clutch-ring 50 into engagement with the wheel 32, which will rotate in the proper direction to cause the pinion 29 to move the clutch-ring 25 into engagement with the ratchet-wheel 23 of the line-spool, and, as will be obvious, the power of the springs will thus be exerted to wind up the line or to exert a considerable drag thereon if the force exerted upon the line by the fish exceeds the power of the motor-springs.

From the foregoing it will be observed that I have produced a simple, ingenious, and highly-efficient reel, embodying automatic mechanism for operating the line-spool, and a manually-operated device serving the dual function of a spool-operating and spring-rewinding member, and, further, embodying novel clutch devices which operate automatically and without derangement of the gearing, and novel means for preventing exertion of such power as may serve to break or derange the parts. Therefore while the present embodiment of my invention appears at this time to be preferable, I desire to reserve the right to incorporate any of these several novel features in any desired type of reel independently of or in combination with the various other novel features, or to effect such changes, modifications, or variations of the illustrated device as may be properly comprehended within the scope of the protection prayed.

What I claim is—

1. In a fishing-reel, the combination with a line-spool, a motor and motor-controlling means, of an operating device movable in different directions to rewind the motor or spool as desired.

2. In a fishing-reel, the combination with a line-spool, motor and motor-controlling means, of an operating member, and means for automatically connecting the member with the spool and motor when said member is moved in different directions, whereby said operating member may be employed to rewind either the motor or spool, as desired.

3. In a fishing-reel, the combination with a line-spool and motor, and means for controlling the operation of the motor, of a manually-operated device movable in different directions to operate the spool and to rewind the motor.

4. In a fishing-reel, the combination with a line-spool, motor and motor-controlling means, of a crank and clutch devices disposed to automatically effect an operative connection of the crank with either the spool or motor when the crank is operated in different directions, whereby said crank may be utilized as spool-operating means or motor-rewinding means, as desired.

5. In a fishing-reel, the combination with a line-spool and motor, of a train of gearing including a pair of clutch devices between the motor and spool and disposed to effect the operation of the spool by the motor, and a manually-operated device disposed when operated in different directions to be connected to either the spool or motor through one or the other of said clutch devices.

6. In a fishing-reel, the combination with a line-spool, motor and motor-rewinding mechanism, of a connecting member intermediate of the spool and motor and also intermediate of the motor and rewinding mechanism, said member having frictional engagement with an element of the motor, whereby said member will yield independently of the motor when subjected to undue strain by either the spool or rewinding mechanism and means for operating the spool through the medium of an element of the motor-rewinding mechanism, whereby the same element is used both to operate the spool and to rewind the motor.

7. In a fishing-reel, the combination with a line-spool, motor and motor-rewinding mechanism, of a connecting member intermediate of the motor and spool and also between the motor and rewinding mechanism, and adjustable means for effecting a frictional engagement of the connecting member with an element of the motor, whereby said member will move independently of the motor when the motor has been subjected to a predetermined strain.

8. In a fishing-reel, the combination with a motor, an arbor driven thereby, a gear-wheel mounted upon the arbor and an adjustable friction-disk carried by the arbor and bearing against the wheel to effect a frictional connection between the wheel and arbor, of a line-spool mounted on the arbor, and gearing intermediate of the gear-wheel and spool.

9. In a fishing-reel, the combination with a motor, an arbor driven thereby, a gear-wheel mounted upon the arbor and an adjustable friction-disk carried by the arbor and bearing against the wheel to effect a frictional connection between the wheel and arbor, of a line-spool mounted on the arbor, motor-rewinding mechanism, and gearing intermediate of the gear-wheel and said rewinding mechanism.

10. In a fishing-reel, the combination with a line-spool and operating mechanism, of an intermediate clutch device disposed to automatically connect the operating mechanism with the spool when said mechanism is operated or to permit the independent rotation of the spool in either direction.

11. In a fishing-reel, the combination with a line-spool provided with a ratchet-wheel, of spool-operating mechanism comprising a pinion, and a clutch-ring having engagement with the pinion and provided with a pawl-tooth disposed for engagement with the ratchet-wheel.

12. In a fishing-reel, the combination with a line-spool and operating mechanism, of an interposed clutch-ring, and a compression-spring bearing against the ring to retain it in position to permit free and independent rotation of the spool.

13. In a fishing-reel, the combination with a line-spool having a ratchet-wheel and operating mechanism including a recessed pinion, of a clutch-ring provided with a tooth engaging the recess in the pinion, a second tooth disposed for engagement with the ratchet, and a compression-spring bearing against the side of the clutch-ring.

14. In a fishing-reel, the combination with a line-spool and operating mechanism, of interposed gearing comprising a clutch device composed of a rotary toothed member, an irregularly-formed clutch-ring disposed for engagement therewith, and a pinion disposed for operative connection with the clutch-ring.

15. In a fishing-reel, the combination with an arbor, of a pinion carried by the arbor, a series of gear-wheels enmeshed with said pinion, and a separate independent motor-spring disposed to impel each of said gear-wheels, a line-spool mounted on the arbor and gearing between the arbor and spool, said gearing being located at the end of the reel opposite the motor and arranged for disconnection from the motor under undue strain.

In testimony that I claim the foregoing as my own I have hereto affixed my signature in the presence of two witnesses.

G. E. MEDLEY.

Witnesses:
JOHN H. SIGGERS,
FLORENCE E. WALTER.